(12) United States Patent
Chung et al.

(10) Patent No.: US 7,374,605 B2
(45) Date of Patent: May 20, 2008

(54) PRINTING INK APPLYING TO VARIOUS TEXTILE MATERIALS, THE PROCESS FOR PREPARING IT AND THE PRINTING METHOD USING IT

(75) Inventors: Kwang Choon Chung, Seoul (KR); Myoung Seon Gong, Seoul (KR); Hoo Shick Kim, Uiwang-si (KR); Byung Hoon Im, Seoul (KR)

(73) Assignee: Inktec Co.Ltd (KR)

( * ) Notice: Subject to any disclaimer, the term of this patent is extended or adjusted under 35 U.S.C. 154(b) by 244 days.

(21) Appl. No.: 10/547,904

(22) PCT Filed: Mar. 6, 2004

(86) PCT No.: PCT/KR2004/000475

§ 371 (c)(1),
(2), (4) Date: Sep. 7, 2005

(87) PCT Pub. No.: WO2004/079079

PCT Pub. Date: Sep. 16, 2004

(65) Prior Publication Data

US 2006/0092249 A1    May 4, 2006

(30) Foreign Application Priority Data

Mar. 7, 2003    (KR) .................. 10-2003-0014498

(51) Int. Cl.
*C09D 11/02* (2006.01)
(52) U.S. Cl. .................. 106/31.27; 106/31.58
(58) Field of Classification Search ............ 106/31.27, 106/31.58
See application file for complete search history.

(56) References Cited

U.S. PATENT DOCUMENTS

| | | | | |
|---|---|---|---|---|
| 3,974,160 A | | 8/1976 | Seiler et al. ................. 260/249 |
| 4,500,455 A | | 2/1985 | Niwa et al. ................. 534/635 |
| 4,515,716 A | | 5/1985 | Niwa et al. ................. 534/635 |
| 4,702,742 A | * | 10/1987 | Iwata et al. .................... 8/495 |
| 4,849,770 A | * | 7/1989 | Koike et al. ................. 347/100 |
| 4,969,951 A | | 11/1990 | Koike et al. .................. 106/22 |
| 5,250,121 A | * | 10/1993 | Yamamoto et al. ......... 442/153 |
| 5,540,764 A | * | 7/1996 | Haruta et al. ............ 106/31.58 |

FOREIGN PATENT DOCUMENTS

| | | |
|---|---|---|
| JP | 3-247665 | 11/1991 |
| KR | 10-0385299 | 7/2002 |
| KR | 10-0385300 | 7/2002 |

OTHER PUBLICATIONS

PCT International Search Report; PCT/KR2004/000475; Dated: Dec. 31, 2004.
Written Opinion of the International Searching Authority of Corresponding PCT Application: PCT/KR2004/000475; Dated: Dec. 31, 2004.

* cited by examiner

*Primary Examiner*—J. A. Lorengo
*Assistant Examiner*—Veronica Faison-Gee
(74) *Attorney, Agent, or Firm*—Cantor Colburn LLP

(57) ABSTRACT

The present invention relates to an inkjet printing ink which has good color developing property and fastness and a broad color gamut in printing various textile materials such as polyesters, cottons, silks, nylons, etc., knitted materials, particularly mixed fibers so that the product value of printed fiber products including garments can be increased, a process for preparation thereof, and a printing method using said ink. Moreover, the present invention provides an ink for inkjet printing suitable for polyester ultrafine microfibers and nylon/polyester ultrafine microfibers.

16 Claims, No Drawings

PRINTING INK APPLYING TO VARIOUS TEXTILE MATERIALS, THE PROCESS FOR PREPARING IT AND THE PRINTING METHOD USING IT

TECHNICAL FIELD

The present invention relates to an inkjet printing ink which has good color developing property and fastness and a broad color gamut in printing various textile materials such as polyesters, cottons, silks, nylons, etc., knitted materials, particularly mixed fibers so that the product value of printed fiber products including garments can be increased, a process for preparation thereof, and a printing method using said ink. Moreover, the present invention provides an ink for inkjet printing suitable for polyester ultrafine microfibers and nylon/polyester ultrafine microfibers.

In the current textile printing market, in order to meet various consumer's desire the production method has been rapidly changed from the prior few products mass production to the small quantity batch production. Since the small quantity batch production requires various designs and rapid delivery, which are difficult to accomplish by the conventional printing method, the production according to the prior analog (conventional) mode is too much inefficient and has a low competitiveness in the economical view. Therefore, presently there is a tendency to spread the use of a digital printing technique utilizing inkjetsystem. The digital inkjet printing technique has been widely used in operating the identification of printing condition, preparing the sample and producing the small quantity of products, and has been measured to would replace the conventional printing methods such as silk screen printing, rotary printing, roller printing, etc. within short period in the future.

The currently commercially available inks for inkjet printing are classified into dye inks and pigment inks, wherein the dye ink is in turn classified into acid ink, reactive ink, disperse ink, etc. Although some samples of the pigment inks are in the market, the dye inks have been generally used due to low color saturation and color developing property of the pigment inks. The acid inks and reactive inks are soluble in water and thus, are used in printing natural fibers such as cotton, silk, etc. To the contrary, the disperse inks are prepared by using the disperse dye as the coloring matter, adding the coloring matter and dispersant to water, thereby dispersing them in water to form the ink. The disperse inks are generally used in printing the synthetic fibers.

BACKGROUND

At present, the fiber materials for garments are generally the mixed fibers of polyester fibers as the synthetic fiber and cotton fibers as the natural fiber, and such mixed fibers are given a great deal of weight on the fiber industry in respective fields. In printing the mixed fibers, since the printing method and conditions of synthetic fibers and natural fibers are different from each other, it is disadvantageous in that two dying steps should be practiced to make the procedures complicate and falls down the economics.

As one strategy to overcome such disadvantages, U.S. Pat. No. 4,969,951 discloses the inks applicable to the mixed fibers using the reactive disperse dyes having both the characters of reactive dyes and disperse dyes, and the inkjet printing method using said inks. However, in preparing said inks the inks colloidized by dispersing the reactive disperse dyes in water are used. In preparing the printing inks through dispersion of dyes, the key is to obtain the stable colloid. However, since it is very difficult to obtain the stable colloid, it should be needed to practice special dispersion procedures such as milling procedure.

General dispersion procedures are presented as follows: To prepare inks, first, dyes and dispersants such as lignin sulfonic acid and naphthalene polymers are homo-mixed in the aqueous system, and then dispersed by means of bead mill or pressure mill, for example, the trade name Microfluidizer manufactured by Microfluidic Inc. in USA. Then, the colloids prepared through micronization are suitably blended. The average particle size of the colloids thus obtained is about 150 nm.

However, it is very difficult to obtain the uniform result from every operations of such dispersion procedure. If the operations to maintain the average particle size below a certain level and to accurately set every property are not properly accomplished, the particles having a larger average particle size fill up the nozzles of inkjet head to cause a poor quality of the products, which makes the successive printing impossible. To the contrary, if the dispersion is too excessive, the particles having a small particle size are excessively increased to cause a change of properties of inks, which induces a change of discharge stability at inkjet head. Further, in order to maintain ultrafine particles much mechanical and electrical energy should be inputted.

Such fine particles are difficult to have the stability, have the storage stability only of six (6) months, and are further difficult to ensure the thermal stability. The reason why the dispersion procedure is practiced in spite of such complicated procedures is that the viscosity of inks should be extremely low in order to increase the color density in view of the characters of inkjet head. In case of the prior disperse dyes, the amount of dyes should be increased in order to increase the color density, and thus, the viscosity of dyes is increased. To prevent such increase in the viscosity the dyes should be present in the form of colloid so that the viscosity is not increased, and thus, can be converted into the inks.

DISCLOSURE OF THE INVENTION

The present invention was developed in order to solve the above-mentioned problems, and solves the problems including the non-uniformity of water-based dispersion procedure and the lowering of product quality to provide a uniform printing ink. According to the present invention, the inks which can be equally applied to various fiber materials such as polyester, cotton, silk, nylon, etc., particularly the mixed fiber thereof and furthermore, even ultrafine microfibers are provided to extend the applicable range of inkjet printing As mentioned above, in order to overcome the disadvantages of the prior dispersion methods the present inventors selected the organic solvent having physical properties suited to inkjet head and developed the inks for inkjet printing by means of the reactive disperse dyes which can be dissolved in said organic solvent.

The present invention provides the method for printing various textile fibers by means of an ink composed of one or more organic solvent and one or more reactive disperse dye soluble in said organic solvent, and such an inkjet ink.

The inkjet inks for fiber printing as provided by the present invention consist of a colorant for color development, a first solvent to dissolve the colorant and a second solvent for wetting action. Furthermore, the inks of the present invention can further include a non-ionic surfactant or an anionic surfactant to control the printing characters.

The dyes suitable to the present invention, i.e. reactive disperse dyes are the water-insoluble dyes having the molecular weight below 800, which have the reactive groups capable of forming covalent bond with hydroxyl groups or amine or amide groups of the fibers in the molecules thereof, such as monochloro(1,3,5)triazine group, dichloro(1,3,5) triazine group, trichloro(1,3,5)triazine group, vinylsulfone group, sulfatoethyl sulfone group, acrylamide group, ethyleneimine group, azide group, sulfone ethyleneimine group, trichloropyrimidine group, monochloro difluoropyrimidine group, chlorobenzothiazole group, dichloropyridazone group, dichloropyridazine group, dichloroquinozaline group, epoxy group, 3-carboxypyridiniotriazine group, etc. Specifically, there are the dyes described in U.S. Pat. Nos. 3,974,160, 4,500,455 and 4,515,716, Japanese laid-open patent publication (Hei) 3-247665, Korean patent publications 2002-004026, 2002-061916 and 2002-061777.

The reactive disperse dyes disclosed in said patents have the properties such as combination of the properties of reactive dyes used for dying the natural fibers including cotton, etc. and the properties of disperse dyes used for synthetic fibers (particularly, polyesters), and possess a multi-functionality applicable to various fibers including cotton, polyester, silk, wool, etc. since they contain the reactive groups in the molecules thereof while having the properties of disperse dyes. Particularly, they can be used for printing the materials which are difficult to print, such as mixed fibers. In case of cotton-poly mixed fibers, dip dyeing is accomplished through two steps of dyeing by means of two solutions, i.e. the dyeing solution of reactive dyes and the dyeing solution of disperse dyes (2-steps 2-baths method), whereas the reactive disperse dyes can be allowed to dye at one time (one-bath 2-steps method). In case of printing (identical to the case of inkjet printing), the treatment of mixed fibers requires the use of two or more inks. However, in such cases it is very difficult to practice the uniform dyeing, and extremely complicated conditions including temperature control, surface pH control, etc. should be required. In such a case, if the inkjet printing is practiced using the reactive disperse dyes presented in said patent publications, it can be accomplished through only one step procedure.

Further, in comparison to general fiber yarns the ultrafine microfibers are very fine, and therefore, the surface area thereof is exponentially increased. Therefore, if the ultrafine micofibers are dyed or printed with general disperse dyes, the color development is decreased and every fastness become also deteriorated. The ultrafine microfibers are classified into polyester ultrafine microfibers and nylon/poly ultrafine microfibers (hereinafter, referred to as "N/P ultrafine microfibers"). Particularly, when the reactive disperse dye inks of the present invention are applied to N/P ultrafine microfibers, the reactive groups are reacted with the amine groups of nylon while are adsorbed to polyesters via van der Waals bond and dye to obtain the printed product having good fastness. In the case of polyester ultrafine microfibers, when they are dyes with the dyes described in the above-mentioned patents, the polar groups are relatively increased in view of the structures of dyes in comparison to the disperse dyes. Therefore, the dyes are characterized in that they are retained on and adsorbed to the surface of polyester materials, rather than penetrated into polyester materials, and thus, the apparent level of dyes are increased to improve the color development and further, the fastness is not accordingly lowered. The structures of the reactive disperse dyes used as the constituent of the inks according to the present invention are presented in the above-listed patent publications. Some typical examples thereof can be represented as follows, although the reactive disperse dyes used in the present invention are not limited thereto:

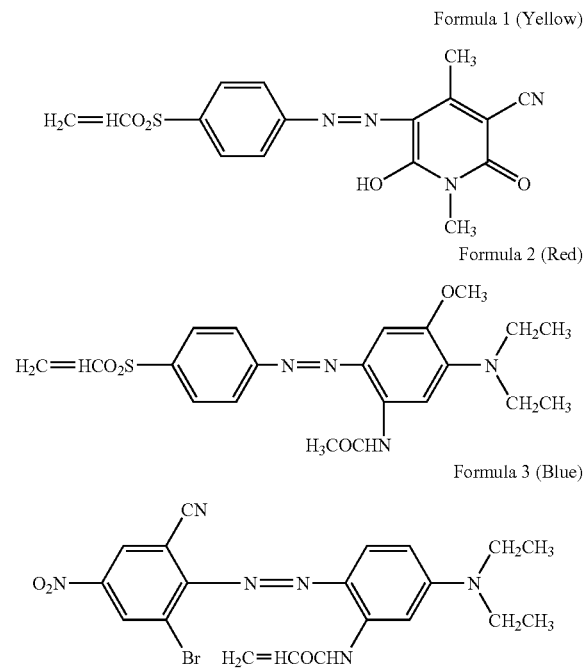

The constitutional ratio in the inks of said reactive disperse dye used as the colorant of the solvent-type fiber printing ink according to the present invention is in the range of 0.5%-10%, preferably in the range of 1%-7%, and more preferably in the range of 1.5%-5% (All the ratios represented in the following are based on the weight).

Although the solvents used in the inkjet inks can be classified into water and the organic solvents, in the present invention the organic solvent which can dissolve the dyes should be used. The organic solvents which have been conventionally used as the inkjet inks in the industrial field include methyl ethyl ketone, methanol, methyl isobutyl ketone, etc. Such inks for industrial purpose adopt the ink discharge method in a continuance mode, which method comprises continuously discharging the ink solution, applying the electric charge to the charged electrode to make separate droplets of inks, and then controlling the direction of ink droplets to the high voltage deflected electrode to produce the printed product having a poor resolution. The inks unused in the printing are recovered to collect in the closed ink tank and then can be reused or wasted. Since the solvents used for inks in the continuance mode have a low boiling point and also, a high volatility, they are unsuitable for the ink discharge method in a drop on demand mode. Further, since the inkjet head is rapidly driven, the ignition point of solvent must not be low. In addition, only when the solvents are maintained at a very low viscosity, they are suitable to the properties of inkjet head. Since the drop on demand mode as selected in the present invention selectively discharge only the ink droplets required for the printing, this method has advantageous in that it provides the printed product having a high resolution, consumes a small amount of inks, uses a simple printing device and requires a little electric power. In particular, the solvent used in the present invention must have a property capable of dissolving reactive groups present in the reactive disperse dyes. The present inventorshave studied the reactive disperse dyes in view of special reactive groups present therein, and found that polar aprotic organic solvents can particularly well dissolve the reactive disperse dyes. In addition, some of the solvents used in the present invention, including dimethylsulfoxide, ethylene carbonate, perchloro ethylene, trichloro ethylene, halogenated aliphatic hydrocarbon compounds, etc., either dissolve crystalline portion of fiber textures of polyesters or nylons, etc. in a minor amount to the extent that they do substantially not affect the quality of fiber materials, or serve as the catalyst which can swell non-crystalline portion of the fibers so that the reactive disperse dyes can be smoothly adsorbed or reacted in the fiber materials, thereby improving the leveling and fastness of the printed products. However, the solvents are not limited to the above-listed one.

Therefore, the inkjet inks for printing the fiber materials according to the present invention have the solvent having selectively one of the following properties (first solvent), as the basic constitution:

a) organic solvents having the solubility more than 1% for the reactive disperse dyes and the self-viscosity of 0.1 cP-30 cP; or b) polar, semi-protic organic solvents; or c) organic solvents which can dissolve a minor amount of fiber textures or exhibit the swelling action.

The examples of organic solvents having the above-mentioned properties include, but are not limited to, 1,3-dimethyl-2-imidazolinone, ethyl lactate, propyl lactate, formamide, 2-pyrrolidinone, N-methyl-2-pyrrolidone, N,N-dimethyl acetamide, N,N-dimethyl formamide, N-cyclohexyl pyrrolidone, N-hydroxyethyl pyrrolidone, hexamethylene phosphoramide, trichloroethylene, etc. The constitutional ration of such first solvent is in the range of 55-99.5%, preferably 70-99% and more preferably 80-95%. The first solvent may be the organic solvent comprising a single component or in the form of a mixture of two or more solvents.

Further, in order to ensure the solution fluidity suitable for the head of inkjet printer and give the wettability the organic solvents such as polyhydric alcohols are used as the second solvent. The constitutional ratio of such second solvent is in the range of 1-30% and preferably 3-20%. The examples of such polyhydric alcohols include, but are not limited to, ethylene glycol, diethylene glycol, triethylene glycol, polyethylene glycol, propylene glycol, polypropylene glycol, propanediol, butanediol, pentanediol, hexylene glycol, glycerin, etc. The second solvent may also be a single component or in the form of a mixture of two or more solvents.

The non-ionic or anionic surfactants can be added in order to maintain the surface tension of inks and control the penetration for respective fiber materials. The examples of non-ionic surfactant include polyethylene oxide and polypropylene oxide block copolymers linked to alkyl chains and fluorine-based surfactants, and the examples of anionic surfactants include dodecyl benzene sulfonic acid sodium, laurylic acid sodium, polyoxyethylene alkyl ether ammonium sulfate, etc., although they are not limited to those as mentioned.

The ratio of surfactants added as above is in the range of 0.05%-5%, preferably in the range of 0.1%-3% and more preferably in the range of 0.07%-1%. The surfactants may also be a single component or in the form of a mixture of two or more surfactants.

The solvent-based inkjet inks for printing fibers as mentioned above can be prepared by blending mixing the components according to the conventional methods. For this purpose, the reactive disperse dyes must be used in the form of powders formed through convection drying or vacuum drying, lyophilizing, etc. after dye synthesis, wherein the moisture content of inks must be within 2% by weight.

The inks thus prepared have generally the surface tension of 30-70 dyn/cm and the viscosity of 1 cP-20 cP and preferably 2 cP-10 cP. The pH value of ink solution is in the range of 3-10 and preferably in the range of 5-9.

The value of surface tension as recorded above was measured with the surface tensiometer (trade name: Surface Tensiomat 21) manufactured by Fisher Scientific Inc., and the viscosity was measured with the viscometer (trade name: DV-II+viscometer) manufactured by Brookfield Inc. The inks thus prepared was used by filtering them through the membrane filter made of Teflon to remove impurities and dye particles having inferior solubility.

The prepared inks can be used to print by filling in the commercially available inkjet printer for fiber materials or the general inkjet printers. The inkjet printers to which the inks of the present invention can be applied are not limited to any one, although the inkjet printers adopting piezo-type head is more preferred to the thermal or bubble jet-type printers.

The materials which can be printed according to the present invention include various materials including polyester fabrics and knits, polyester ultrafine microfibers, polyester-nylon mixed fabrics and knits, N/P ultrafine microfiber fabrics, poly cotton mixed fabrics, knits, silks, cottons and viscose, etc. Particularly, the fiber materials suitable for the purpose of the present invention are various kinds of mixed fibers and polyester ultrafine microfibers and N/P ultrafine microfiners, from which the good printed products can be obtained in view of color development and general fastness.

For printing the fiber materials with the inks prepared according to the present invention, the fiber materials as listed above must be previously pre-treated. This pre-treatment step may be carried out either in the padding manner such as manual operation or roller operation with the pre-treating solution as in the existing printing factories or in the coating manner such as inkjet or spray methods. The compositions of the pre-treating solution are blended using the paste (e.g. sodium alginate as water-soluble natural polymers) constituted at the time of preparing the existing screen printing paste as the major component but are varied depending on the pre-treatment manner.

The fiber materials pre-treated as above are printed with the inks according to the present invention and then, treated with the conventional known printing after treatment, i.e. steaming, dry heating, high temperature steaming (HT steaming) methods, etc. to fix the dyes to the fiber materials. The process in this manner is conducted according to the method known in the relevant technical field. Depending on the kinds of fiber materials, the resulting products are subjected to reduction clearing and alkaline clearing, washed with the neutral detergent and then finishing washed with clean water. Then, the finished garment products can be manufactured through cutting and sewing operations.

BEST MODE FOR CARRYING OUT THE INVENTION

The following examples and comparative examples are described for the purpose to help the understanding of the present invention. Unless otherwise stated, the percent(%) denotes wt.%.

EXAMPLE 1

| Preparation of ink (A) | |
|---|---|
| Dye of formula 3 (blue) | 5% |
| Dimethylformamide | 90% |
| Propylene glycol | 4% |
| Pluronic P84 | 1% |

The above-mentioned components were mixed by means of the stirrer for about 30 minutes and then filtered with Teflon-made 0.45 m MFS membrane filter (manufactured by Advantec MFS, Inc.) to obtain the ink (A) having surface tension of 33 dyn/cm and viscosity of 3.0 cP.

EXAMPLE 2

| Preparation of ink (B) | |
| --- | --- |
| Dye of formula 3 (blue) | 4% |
| Dimethylsulfoxide | 85% |
| Polyethylene glycol (MW 400) | 10% |
| Pluronic L92 | 1% |

The above-mentioned components were mixed and filtered by the same method as Example 1 to obtain the ink (B) having surface tension of 32 dyn/cm and viscosity of 3.9 cP.

COMPARATIVE EXAMPLE 1

| (1) Preparation of dispersion | |
| --- | --- |
| C.I. disperse blue 60 | 20% |
| Naphthalene formaldehyde copolymer | 5% |
| Distilled water | 75% |

The above components were filled in a suitable vessel, sufficiently mixed, stirred and then milled with a dyno-mill (trade name: KDL-A, manufactured by BACHOFEN, Switzerland) charged with 80% $ZrO_2$ beads 0.5 mm with circulating for 12 hours to prepare the dispersion having the final average particle size of 155 nm [measured by particle size analyzer, Zetaplus manufactured by Brookhaven, Inc.].

| (2) Preparation of water-based ink (C) | |
| --- | --- |
| Dispersion of the above (1), (blue) | 20% |
| Ethylene glycol | 20% |
| Glycerin | 10% |
| Pluronic L62 [manufactured by BASF] | 1% |
| Distilled water | 49% |

The above components were sufficiently stirred with a stirrer and then filtered through membrane filter pore size 1.0 to obtain the ink (C) having surface tension of 40 dyn/cm and viscosity of 5.0 cP.

COMPARATIVE EXAMPLE 2

| (1) Preparation of dispersion | |
| --- | --- |
| Dye of formula 3 (blue) | 20% |
| Lignin sulfonic acid | 5% |
| Distilled water | 75% |

The above components were dispersed according to the same manner as Comparative Example 1(1) to obtain the dispersion having the final average particle size of 155 nm.

| (2) Preparation of water-based ink (D) | |
| --- | --- |
| Dispersion of the above (1) | 20% |
| Ethylene glycol | 20% |
| Glycerin | 10% |
| Pluronic L62 [manufactured by BASF] | 1% |
| Distilled water | 49% |

The above components were filtered according to the same manner as Comparative Example 1(2) to obtain the ink (D) having surface tension of 35 dyn/cm and viscosity of 4.8 cP.

EXPERIMENT 1

The inks prepared according to the above Examples 1 and 2 and Comparative Examples 1 and 2 were used to print silk, cotton, polyester, polyester ultrafine microfiber and N/P ultrafine microfiber, respectively, with Epson Stylus Color 3000 Printer (trade name; manufactured by Epson, Inc.). Then, the printed product silk and cotton were steamed at 102° C. for 20 minutes and 10 minutes, respectively, washed and then dried to obtain the final printed products. After printing polyester, polyester ultrafine microfiber and N/P ultrafine microfiber, they were treated with dry heating at 175° C. for 10 minutes in the oven, cleaned with reduction, and then dried to obtain the printed Products. The relevant results thus obtained were summarized in the following Table 1. The definitions of OD and ΔE* as the experimental values are described below Table 1, and were obtained by means of Spectrodensitrometer 530 of X-RITE, Inc.

TABLE 1

| Inks | | Color Development | Silk (twill) | Cotton (plain weave 40 yarns) | Polyester (samuz) | Polyester ultrafine microfiber | N/P ultrafine microfiber |
| --- | --- | --- | --- | --- | --- | --- | --- |
| Ex. 1 | A | OD[(1)] | 1.12 | 1.01 | 1.63 | 1.40 | 1.35 |
| | | ΔE*[(2)] | 59.72 | 56.64 | 65.11 | 63.79 | 62.27 |
| Ex. 2 | B | OD | 1.03 | 0.92 | 1.47 | 1.31 | 1.23 |
| | | ΔE* | 58.71 | 55.30 | 63.44 | 63.42 | 62.04 |
| Comp. Ex. 1 | C | OD | Not printed | Not printed | 1.30 | 1.12 | 1.04 |
| | | ΔE* | | | 61.21 | 60.50 | 59.63 |

TABLE 1-continued

| Inks | | Color Development | Silk (twill) | Cotton (plain weave 40 yarns) | Polyester (samuz) | Polyester ultrafine microfiber | N/P ultrafine microfiber |
|---|---|---|---|---|---|---|---|
| Comp. Ex. 2 | D | OD | 0.95 | 0.88 | 1.41 | 1.24 | 1.20 |
| | | ΔE* | 57.43 | 54.72 | 62.99 | 62.77 | 61.54 |

Note)
[1] OD: Optical density calculated as OD = $-\log_{10}$ the higher the value, the higher the tone of color.
[2] ΔE*: $E_2^* - E_1^*$ ($E1^*$ is the E* value of pre-treated original material before printing and $E_2^*$ is the E* value upon completion of aftertreatment procedure after printing.

The E* value is recorded as $\sqrt{\{(L)2+(a)2+(b)2\}}$, wherein L is the intrinsic value of color brightness as represented in numerical value, a is the intrinsic value of color for red/green grade as represented in numerical value, and b is the intrinsic value of color for blue/yellow grade as represented in numerical value. Thus, the higher the ΔE* numerical value, the higher the relative tone of color.

As can be seen from the above, the inkjet printed products obtained from the inks prepared according to the present invention have a high color development in comparison to the printed materials with inks prepared by the comparative examples.

EXAMPLE 3

| Preparation of ink (E) | |
|---|---|
| Dye of formula 1 (yellow) | 2% |
| Dimethylsulfoxide | 90% |
| Ethylene glycol | 7% |
| Pluronic L62 | 1% |

The above-mentioned components were mixed and filtered by the same method as Example 1 to obtain the ink (E) having surface tension of 35 dyn/cm and viscosity of 3.5 cP.

EXAMPLE 4

| Preparation of ink (F) | |
|---|---|
| Dye of formula 1 (yellow) | 1.5% |
| 1,3-Dimethyl-2-imidazolinone | 67.5% |
| N-Methyl pyrrolidone | 20% |
| Polyethylene glycol (MW 400) | 10% |
| Pluronic L92 | 1% |

The above-mentioned components were mixed and filtered by the same method as Example 1 to obtain the ink (F) having surface tension of 33 dyn/cm and viscosity of 3.9 cP.

COMPARATIVE EXAMPLE 3

| (1) Preparation of dispersion | |
|---|---|
| Dye of formula 1 (yellow) | 20% |
| Lignin sulfonic acid | 5% |
| Distilled water | 75% |

The above components were dispersed by the same method as Comparative Example 1(1) to prepare the dispersion having the final average particle size of 155 nm.

| (2) Preparation of water-based ink (G) | |
|---|---|
| Dispersion of the above (1), blue | 10% |
| Ethylene glycol | 20% |
| Glycerin | 10% |
| Pluronic L72 [manufactured by BASF] | 1% |
| Distilled water | 59% |

The above components were filtered by the same method as Comparative Example 1(2) to obtain the ink (G) having surface tension of 40 dyn/cm and viscosity of 4.3 cP.

EXPERIMENT 2

The inks prepared according to the above Examples 3 and 4 and Comparative Example 3 were treated by the same method as Experiment 1, respectively, to obtain the printed products. The obtained results are summarized in the following Table 2, wherein other conditions and related matters except for the kinds of inks are identical to those in Table 1.

TABLE 2

| Inks | | Color Development | Silk (twill) | Cotton (plain weave 40 yarns) | Polyester (samuz) | Polyester ultrafine microfiber | N/P ultrafine microfiber |
|---|---|---|---|---|---|---|---|
| Ex. 3 | E | OD | 0.55 | 0.41 | 0.79 | 0.65 | 0.61 |
| | | ΔE* | 82.00 | 78.13 | 88.99 | 87.14 | 86.55 |

TABLE 2-continued

| Inks | | Color Development | Silk (twill) | Cotton (plain weave 40 yarns) | Polyester (samuz) | Polyester ultrafine microfiber | N/P ultrafine microfiber |
|---|---|---|---|---|---|---|---|
| Ex. 4 | F | OD | 0.51 | 0.38 | 0.78 | 0.63 | 0.60 |
| | | ΔE* | 81.73 | 75.45 | 88.73 | 87.01 | 86.98 |
| Comp. Ex. 3 | G | OD | 0.49 | 0.35 | 0.75 | 0.60 | 0.59 |
| | | ΔE* | 80.51 | 74.46 | 88.10 | 86.71 | 86.12 |

As can be seen from the above, the inkjet printed products obtained from the inks prepared according to the present invention have a high color development in comparison to the printed materials with inks prepared by the comparative examples.

EXAMPLE 5

| Preparation of ink (H) | |
|---|---|
| Dye of formula 2 (red) | 5% |
| N-Methyl pyrrolidone | 90% |
| Polyethylene glycol (MW 400) | 4% |
| Pluronic F108 | 1% |

The above-mentioned components were mixed and filtered by the same method as Example 1 to obtain the ink (H) having surface tension of 31 dyn/cm and viscosity of 4.5 cP.

EXAMPLE 6

| Preparation of ink (I) | |
|---|---|
| Dye of formula 2 (red) | 4% |
| 1,3-Dimethyl-2-imidazolinone | 65% |
| N-Methyl pyrrolidone | 20% |
| Polyethylene glycol (MW 400) | 10% |
| Pluronic L72 | 1% |

The above-mentioned components were mixed and filtered by the same method as Example 1 to obtain the ink (I) having surface tension of 30 dyn/cm and viscosity of 4.5 cP.

EXAMPLE 7

| Preparation of ink (J) | |
|---|---|
| Dye of formula 2 (red) | 4% |
| 1,3-Dimethyl-2-imidazolinone | 65% |
| N,N-Dimethyl acetamide | 20% |
| Polyethylene glycol (MW 400) | 10% |
| Pluronic L92 | 1% |

The above-mentioned components were mixed and filtered by the same method as Example 1 to obtain the ink (I) having surface tension of 32 dyn/cm and viscosity of 4.6 cP.

EXAMPLE 8

| Preparation of ink (K) | |
|---|---|
| Dye of formula 2 (red) | 4% |
| Ethyl lactate | 65% |
| N-Methyl pyrrolidone | 20% |
| Polyethylene glycol (MW 400) | 10% |
| Pluronic L35 | 1% |

The above-mentioned components were mixed and filtered by the same method as Example 1 to obtain the ink (K) having surface tension of 30 dyn/cm and viscosity of 4.0 cP.

COMPARATIVE EXAMPLE 4

| (1) Preparation of dispersion | |
|---|---|
| Dye of formula 2 (red) | 20% |
| Naphthalene formaldehyde copolymer | 5% |
| Distilled water | 75% |

The above components were dispersed by the same method as Comparative Example 1(1) to prepare the dispersion having the final average particle size of 140 nm.

| (2) Preparation of water-based ink (L) | |
|---|---|
| Dispersion of the above (1) | 20% |
| Ethylene glycol | 20% |
| Glycerin | 10% |
| Pluronic L108 [manufactured by BASF] | 1% |
| Distilled water | 49% |

The above components were filtered by the same method as Comparative Example 1(2) to obtain the ink (L) having surface tension of 33 dyn/cm and viscosity of 5.1 cP.

EXPERIMENT 3

The inks prepared according to the above Examples 5 to 8 and Comparative Example 4 were treated by the same method as Experiment 1, respectively, to obtain the printed products. The obtained results are summarized in the following Table 3, wherein other conditions and related matters except for the kinds of inks are identical to those in Table 1.

TABLE 3

| Inks | | Color Development | Silk (twill) | Cotton (plain weave 40 yarns) | Polyester (samuz) | Polyester ultrafine microfiber | N/P ultrafine microfiber |
|---|---|---|---|---|---|---|---|
| Ex. 5 | H | OD | 1.49 | 1.39 | 1.77 | 1.63 | 1.61 |
| | | ΔE* | 72.54 | 70.01 | 75.63 | 73.34 | 74.01 |
| Ex. 6 | I | OD | 1.10 | 1.04 | 1.51 | 1.43 | 1.38 |
| | | ΔE* | 65.19 | 63.20 | 72.39 | 70.49 | 69.70 |
| Ex. 7 | J | OD | 1.09 | 1.04 | 1.54 | 1.43 | 1.39 |
| | | ΔE* | 65.14 | 63.23 | 72.51 | 70.50 | 69.80 |
| Ex. 8 | K | OD | 1.11 | 1.02 | 1.53 | 1.41 | 1.38 |
| | | ΔE* | 66.02 | 63.40 | 72.40 | 70.33 | 69.91 |
| Comp. Ex. 4 | L | OD | 0.91 | 0.84 | 1.47 | 1.34 | 1.18 |
| | | ΔE* | 60.27 | 58.20 | 70.15 | 67.09 | 63.25 |

As can be seen from the above, the inkjet printed products obtained from the inks prepared according to the present invention have a high color development in comparison to the printed materials with inks prepared by the comparative examples.

EXPERIMENT 4

The inks prepared by the above examples and comparative examples were respectively placed in the closed vessel, stored for 30 days, 90 days and 180 days at room temperature (25° C.) and then observed for the storage stability. The observed results are summarized in the following Table 4.

TABLE 4

| Inks | | After 30 days storage | After 90 days storage | After 180 days storage |
|---|---|---|---|---|
| Example 1 | A | ◎ | ◎ | ◎ |
| Example 2 | B | ◎ | ◎ | ◎ |
| Comp. Example 1 | C | ○ | X | X |
| Comp. Example 2 | D | ◎ | Δ | X |
| Example 3 | E | ◎ | ◎ | ◎ |
| Example 4 | F | ◎ | ◎ | ◎ |
| Comp. Example 3 | G | ◎ | Δ | X |
| Example 5 | H | ◎ | ◎ | ◎ |
| Example 6 | I | ◎ | ◎ | ◎ |
| Example 7 | J | ◎ | ◎ | ◎ |
| Example 8 | K | ◎ | ◎ | ◎ |
| Comp. Example 4 | L | ○ | Δ | X |

◎: no occurrence of aggregation, no increase in viscosity
○: occurrence of very slight aggregation, average particle size less than 200 nm
Δ: occurrence of small aggregation, average particle size 200 nm to less than 300 nm
X: occurrence of much aggregation, average particle size above 300 nm From the above result, it could be seen that the water-based inks according to Comparative Examples 1 to 4 exhibit a decrease in storage stability and the inks of Examples 1 to 8 maintain the very stable state.

As can be seen from the above, the inkjet printed products obtained from the inks prepared according to the present invention have a high color development in comparison to the printed materials with inks prepared by the comparative examples.

Although the present invention was described with respect to those considered as being the preferred embodiment, it should be understood that the present invention is not limited to the disclosed embodiment since the present invention is characterized by the process for preparing inks which can omit the dispersion step to obtain the stable colloid in preparing the printing inks, and further by such inks.

INDUSTRIAL APPLICABILITY

As disclosed above, the present invention can provide a printing ink which can be widely applied to various fibers, particularly, mixed fibers and N/P ultrafine microfibers. The present invention can also simplify the process for preparation of inks due to omission of complicated and difficult dispersion step in preparing the printing inks, and furthermore, can provide the printing inks having good color development and storage stability.

The invention claimed is:

1. An inkjet printing ink, characterized in that it consists of 0.5~10 weight% of a reactive disperse dye and 90~99.5 weight% of a solvent capable of dissolving said dye, wherein the reactive disperse dye is insoluble in water, has the molecular weight of up to 800, and has one or more reactive group selected from the group consisting of monochloro(1,3,5)triazine, dichloro(1,3,5)triazine, trichloro(1,3,5)triazine, vinylsulfone, sulfatoethyl sulfone, acrylamide, ethyleneimine, azide, sulfone ethyleneimine, trichloropyrimidine, monochlorodifluoropyrimidine, chlorobenzothiazole, dichloropyridazone, dichloropyridazine, dichloroquinozaline, epoxy and 3-carboxypyridiniotriazine, and the solvent is one or more organic solvent selected from the group consisting of dimethylsulfoxide, 1,3-dimethyl-2-imidazolinone, ethyl lactate, propyl lactate, formamide, 2-pyrrolidinone, N-methyl-2-pyrrolidone, N,N-dimethyl acetamide, N,N-dimethyl formamide, N-cyclohexyl pyrrolidone, N-hydroxyethyl pyrrolidone, hexamethylene phosphoramide and trichloroethylene.

2. An inkjet printing ink, characterized in that it consists of 0.5~10 weight% of a reactive disperse dye, 60~98.5 weight% of a solvent capable of dissolving said dye and 1~30 weight% of a polyhydric alcohol having 2 to 30 carbon atoms, wherein the reactive disperse dye is insoluble in water and has the molecular weight of up to 800, and has a reactive group selected from the group consisting of monochloro(1,3,5)triazine, dichloro(1,3,5)triazine, trichloro(1,3,5)triazine, vinylsulfone, sulfatoethyl sulfone, acrylamide, ethyleneimine, azide, sulfone ethyleneimine, trichloropyrimidine, monochlorodifluoropyrimidine, chlorobenzothiazole, dichloropyridazone, dichloropyridazine, dichloroquinoxaline, epoxy and 3-carboxypyridiniotriazine, and the solvent is one or more organic solvent selected from the group consisting of dimethylsulfoxide, 1,3-dimethyl-2-imidazolinone, ethyl lactate, propyl lactate, formamide, 2-pyrrolidinone, N-methyl-2-pyrrolidone, N,N-dimethyl acetamide, N,N-dimethyl formamide, N-cyclohexyl pyrrolidone, N-hydroxyethyl pyrrolidone, hexamethylene phosphoramide and trichloroethylene.

3. An inkjet printing ink, characterized in that it consists of 0.5~10 weight% of a reactive disperse dye, 55~98.45 weight% of a solvent capable of dissolving said dye, 1~30 weight% of a polyhydric alcohol having 2 to 30 carbon atoms and 0.05~5 weight% of a non-ionic or anionic surfactant, wherein the reactive disperse dye is insoluble in water, has a molecular weight of up to 800, and has a reactive group selected from the group consisting of monochloro(1,3,5)triazine, dichloro(1,3,5)triazine, trichloro (1,3,5)triazine, vinylsulfone, sulfatoethyl sulfone, acrylamide, ethyleneimine, azide, sulfone ethyleneimine, trichloropyrimidine, monochlorodifluoropyrimidine, chlorobenzothiazole, dichloropyridazone, dichloropyridazine, dichloroquinoxaline, epoxy and 3-carboxypyridiniotriazine, and the solvent is one or more organic solvent selected from the group consisting of dimethylsulfoxide, 1,3-dimethyl-2-imidazolinone, ethyl lactate, propyl lactate, formamide, 2-pyrrolidinone, N-methyl-2-pyrrolidone, N,N-dimethyl acetamide, N,N-dimethyl formamide, N-cyclohexyl pyrrolidone, N-hydroxyethyl pyrrolidone, hexamethylene phosphoramide and trichloroethylene.

4. A process for preparing an ink characterized by the surface tension 30-70 dyn/cm, the viscosity of 1-20 cP and pH 3-10, which comprises mixing respective components according to claim 1.

5. An inkjet printing process comprising applying the ink to the fiber materials in an inkjet manner and fixing and washing steps, characterized in that said ink is the ink according to claim 1.

6. A process for preparing an ink characterized by the surface tension 30-70 dyn/cm, the viscosity of 1-20 cP and pH 3-10, which comprises mixing respective components according to claim 2.

7. A process for preparing an ink characterized by the surface tension 30-70 dyn/cm, the viscosity of 1-20 cP and pH 3-10, which comprises mixing respective components according to claim 3.

8. An inkjet printing process comprising applying the ink to the fiber materials in an inkjet manner and fixing and washing steps, characterized in that said ink is the ink according to claim 2.

9. An inkjet printing process comprising applying the ink to the fiber materials in an inkjet manner and fixing and washing steps, characterized in that said ink is the ink according to claim 3.

10. The inkjet printing ink of claim 1, wherein said reactive disperse dye has the formula selected from the group consisting of:

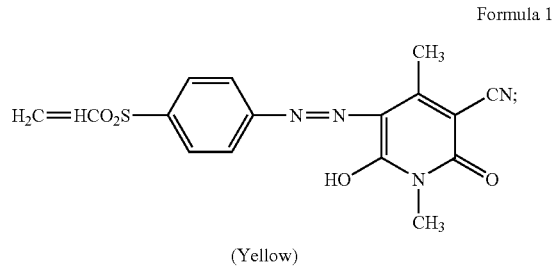

(Yellow) Formula 1

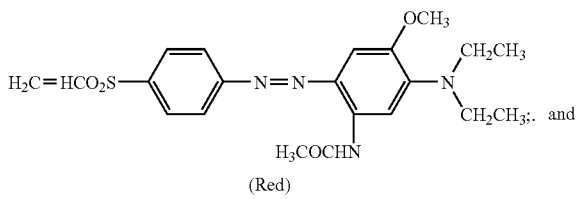

(Red) Formula 2

(Blue) Formula 3

11. The inkjet printing ink of claim 1, wherein said organic solvent is selected from the group consisting of dimethylsulfoxide, 1,3-dimethyl-2-imidazolinone, ethyl lactate, N-methyl-2-pyrrolidone, N,N-dimethyl acetamide, N,N-dimethyl formamide, and a mixture thereof.

12. The inkjet printing ink of claim 1, wherein said reactive disperse dye has the formula selected from the group consisting of:

(Yellow) Formula 1

(Red) Formula 2

(Blue) Formula 3

13. The inkjet printing ink of claim 2, wherein said organic solvent is selected from the group consisting of dimethylsulfoxide, 1,3-dimethyl-2-imidazolinone, ethyl lactate, N-methyl-2-pyrrolidone, N,N-dimethyl acetamide, N,N-dimethyl formamide, and a mixture thereof

14. The inkjet printing ink of claim 2, wherein said reactive disperse dye has the formula selected from the group consisting of:

Formula 1

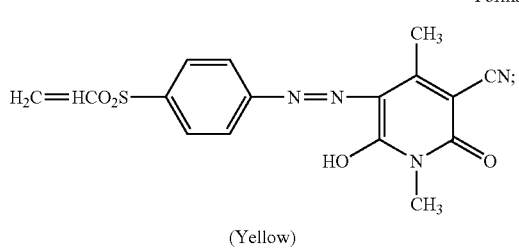

(Yellow)

Formula 2

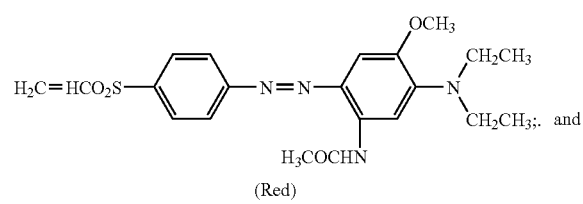

(Red)

Formula 3

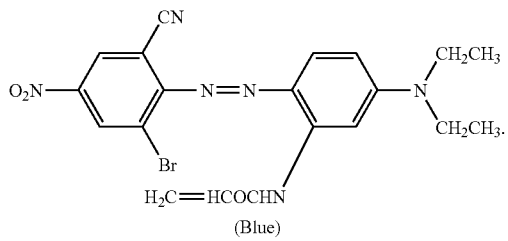

(Blue)

15. The inkjet printing ink of claim 3, wherein said organic solvent is selected from the group consisting of dimethylsulfoxide, 1,3-dimethyl-2-imidazolinone, ethyl lactate, N-methyl-2-pyrrolidone, N,N-dimethyl acetamide, N,N-dimethyl formamide, and a mixture thereof.

16. The inkjet printing ink of claim 3, wherein said reactive disperse dye has the formula selected from the group consisting of:

Formula 1

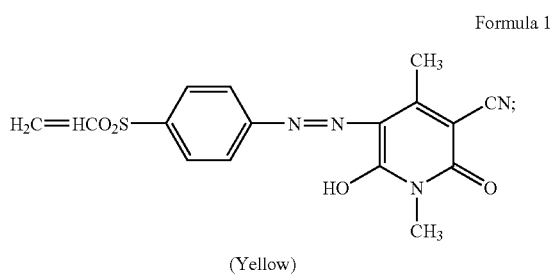

(Yellow)

Formula 2

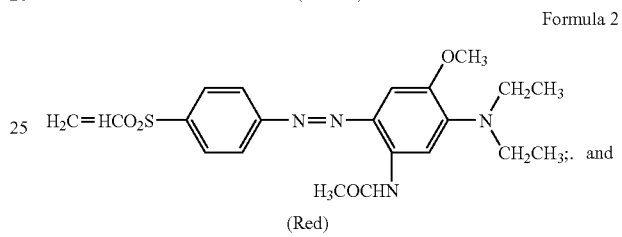

(Red)

Formula 3

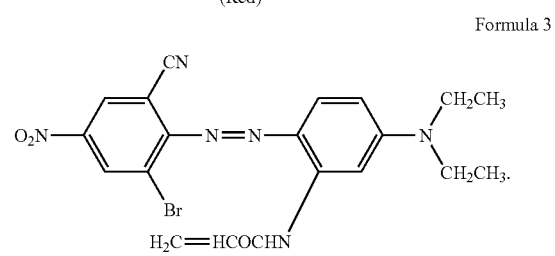

(Blue)

* * * * *